United States Patent [19]

McKay

[11] 4,031,002

[45] June 21, 1977

[54] PASSIVATING METALS ON CRACKING CATALYSTS WITH ANTIMONY COMPOUNDS

[75] Inventor: Dwight L. McKay, Bartlesville, Okla.

[73] Assignee: Phillips Petroleum Company, Bartlesville, Okla.

[22] Filed: June 11, 1976

[21] Appl. No.: 695,218

Related U.S. Application Data

[62] Division of Ser. No. 550,584, Feb. 18, 1975, abandoned.

[52] U.S. Cl. .................... 208/113; 208/48 AA; 208/119; 208/120; 252/411 R; 252/415; 252/437; 252/439; 252/456
[51] Int. Cl.² .................... C10G 11/04; C10G 9/16
[58] Field of Search ............ 208/113–120, 208/48 AA; 252/411–415

[56] References Cited

UNITED STATES PATENTS

| | | | |
|---|---|---|---|
| 2,129,693 | 9/1938 | Houdry | 208/119 |
| 2,758,097 | 8/1956 | Doherty et al. | 252/413 |
| 3,396,183 | 8/1968 | Brasch | 260/429 |
| 3,711,422 | 1/1973 | Johnson et al. | 252/414 |
| 3,776,835 | 12/1973 | Dvoracek | 208/48 |
| 3,840,463 | 10/1964 | Froeschmann et al. | 252/32.7 E |

*Primary Examiner*—Delbert E. Gantz
*Assistant Examiner*—G. E. Schmitkons

[57] ABSTRACT

Metals on a cracking catalyst are passivated by contacting the catalyst with at least one compound selected from the group of compounds having the general formula

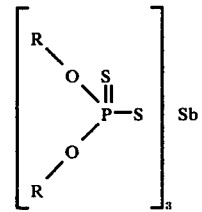

wherein the R groups which can be the same or different consist of hydrocarbyl radicals having 1 to about 18 carbon atoms per radical, the overall number of carbon atoms per molecule being 6 to about 90.

11 Claims, No Drawings

PASSIVATING METALS ON CRACKING CATALYSTS WITH ANTIMONY COMPOUNDS

This is a divisional application of my copending U.S. Pat. application Ser. No. 550,584, filed Feb. 18, 1975, now abandoned for continuation Ser. No. 713,776 filed Aug. 12, 1976.

This invention relates to the art of catalytic cracking of hydrocarbons.

More specifically, the invention relates to the regeneration of used cracking catalysts. Particularly, the invention relates to the passivation of metals on cracking catalysts.

BACKGROUND OF THE INVENTION

Hydrocarbon feedstock containing higher molecular weight hydrocarbons is cracked by contacting it under elevated temperatures with a cracking catalyst whereby light distillates are produced. However, the cracking catalyst gradually deteriorates during this process. One source for this deterioration is the deposition of metals, such as nickel, vanadium and iron, on the catalyst which increase the production of hydrogen, dry gas and coke. At the same time the conversion of the hydrocarbons into gasoline is reduced.

The Invention

It is one object of this invention to provide a new catalytic cracking process.

Another object of this invention is to provide a process for regeneration of the used cracking catalyst.

A further object of this invention is to provide a process for the passivation of metals deposited on the cracking catalyst.

Further objects, embodiments, advantages and features of this invention will be apparent from the following detailed description of the invention and the appended claims.

In accordance with this invention, I have now found that contaminating metals deposited on cracking catalysts and deactivating said cracking catalysts can be passivated by contacting said cracking catalyst with at least one antimony compound having the general formula

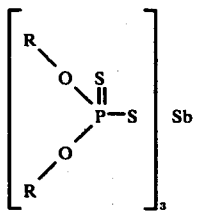

wherein the R groups which can be the same or different are hydrocarbyl radicals each containing from 1 to about 18 carbon atoms, the overall number of carbon atoms per molecule being 6 to about 90 and depositing said antimony compound on said catalyst such as to passivate said contaminating metals. The antimony compounds are known chemical compounds. Among these antimony compounds the preferred ones are those wherein the R groups are alkyl radicals having 2 to about 10 carbon atoms per radical, the n-propyl and the octyl radicals being presently preferred, substituted or unsubstituted $C_5$ or $C_8$ cycloalkyl radicals and substituted or unsubstituted phenyl radicals. Examples for these radicals R are ethyl, n-propyl, isopropyl, n-, iso-, sec- and tert-butyl, amyl, n-hexyl, isohexyl, 2-ethylhexyl, n-heptyl, n-octyl, iso-octyl, tert-octyl, dodecyl, octyldecyl, cyclopentyl, methyl cyclopentyl, cyclohexyl, methylcyclohexyl, ethyl cyclohexyl, phenyl, tolyl, cresyl, ethyl phenyl, butylphenyl, amylphenyl, octylphenyl, vinylphenyl and the like.

Since the antimony compound useful in accordance with this invention for passivating the metals on the cracking catalyst can also be a mixture of different antimony compounds of the general formula given above, the treating agent can also be defined by the range of weight percentage of antimony. The preferred antimony composition thus can be defined to be within the range of about 6 to about 21 weight percent antimony.

The phosphorodithioate compounds can be prepared by reacting an alcohol, such as phenol, with phosphorus pentasulfide to produce the dihydrocarbylphosphorodithioic acid. To produce the metal salts the acid can be neutralized with antimony trioxide and the antimony derivatives are recovered from the mixture. Alternately, the dihydrocarbyl phosphorodithioic acid can be reacted with ammonia to form the ammonium salt which is reacted with antimony trichloride to form the antimony salt. The antimony compounds are then recovered from the reaction mixtures.

The quantity of the antimony compound employed in accordance with this invention can be varied in reasonable ranges. The range for the quantity of the antimony compound employed is related to the quantity of cracking catalyst to be treated. This range can vary considerably. It is, however, presently preferred to use the antimony compound in a quantity of less than about 1.5 weight percent based on the weight of the cracking catalyst, and generally in the range from about 0.1 to about 1.3 wt. %.

The cracking catalyst can be contacted with the antimony compound in various ways. One way is to impregnate the cracking catalyst with a solution of the antimony compound in a solvent such as cyclohexane. In another embodiment the antimony compound is metered to the feed oil of the catalytic cracker upstream of the feed pump. This procedure effects thorough dilution and mixing of the feed oil with the antimony compound and avoids laydowns of this antimony compound on, e.g., the heat exchanger walls.

The antimony compound, if added to the hydrocarbon feedstock, is added in a quantity in the range of about 0.1 to 15,000 ppm of feedstock although higher levels can be employed for rapid deposition. The quantity of antimony compounds actually employed depend upon the amount of antimony compound desired to be deposited on the cracking catalyst and the rate of catalyst withdrawal and addition. Once the desired level of the antimony compound on the cracking catalyst has been reached, only a small quantity of the antimony compound is continued to be metered to the feedstock so that the desired level of this compound on the catalyst at equilibrium conditions is maintained.

In accordance with a further aspect of this invention, I have discovered that a cracking process wherein a hydrocarbon feedstock is introduced into a cracking zone and contacted with cracking catalyst under cracking conditions, wherein the cracked feedstock is removed from said cracking zone for further processing, wherein said cracking catalyst is regenerated by contacting said cracking catalyst with an antimony compound for passivating metals deposited on said cracking catalyst and by heating said cracking catalyst having deposited thereon said antimony compound in the presence of free oxygen-containing gas can be improved in its efficiency by using as an antimony compound a compound having the general formula

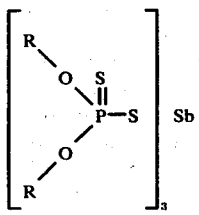

wherein the R groups which can be the same or different are hydrocarbyl radicals containing from 1 to about 18 carbon atoms per radical, the total number of carbon atoms per antimony compound molecule being from 6 to about 90.

In accordance with one embodiment of this cracking process, the cracking catalyst is circulated from the cracking zone to the regeneration zone and back and the antimony compound is metered into the hydrocarbon feedstock upstream of a feed pump feeding the feedstock into the cracking zone. After feeding a sufficient quantity of antimony compound to the feedstock so that the desired level of antimony compound on the cracking catalyst is reached, the quantity of antimony compound metered into the feedstock is controlled such as to maintain the desired level of antimony compound on the catalyst. Thus, constant cracking and regeneration conditions can be maintained and the efficiency of the cracking process can be improved.

The feedstocks used for the cracking process are conventional hydrocarbon feedstocks, namely, petroleum, fuel oil, shale oil, gas oil, topped crudes, etc. The cracking step of the catalytic cracking process is carried out at elevated temperatures of about 800° to about 1200° F. and at pressures in the range from atmospheric pressure up to several hundred atmospheres.

The catalyst used for the cracking step is a conventional cracking catalyst. Particularly suitable are active clay catalysts having deposited thereon small quantities of rare earth metals, such as cerium and lanthanum.

The invention will be more fully understood from the following examples which constitute preferred embodiments of this invention which are, however, not intended to limit the scope thereof.

EXAMPLE I

A sample of used active clay catalyst containing deposited contaminating metals were dried in a fluid bed at 900° F. The catalyst was the commercially available F-1000 catalyst of the Filtrol Corporation which had been used in a commercial cracking unit. This unused catalyst as received from the manufacturer contained about 0.4 weight percent of cerium and about 1.4 weight percent of lanthanum calculated as the metal as well as smaller amounts of other metal compounds. The weight percentages calculated as weight percent metal of these other metal components were as follows: 0.01 weight percent nickel, 0.03 weight percent vanadium. 0.36 weight percent iron, 0.16 weight percent calcium, 0.27 weight percent sodium, 0.25 weight percent potassium and less than 0.01 weight percent lithium. The used catalyst, in contrast, calculated on the same basis as before contained 0.38 weight percent nickel, 0.60 weight percent vanadium, 0.90 weight percent iron, 0.28 weight percent calcium, 0.41 weight percent sodium, 0.27 weight percent potassium and less than 0.01 weight percent lithium. The metals which were passivated by the practice of this invention are nickel, vanadium and iron. The unused catalysts had a pore volume of about 0.4 cc/g and a surface area of about 200 square meters/gram. The used catalyst had about the same pore volume and a surface area of about 72 square meters per gram.

The dried catalyst was divided into ten portions. In the first series of runs, five of these portions were used. With the exception of one portion which serves as a reference, all of the other four portions were impregnated at ambient temperature with solutions of an antimony 0,0-dihydrocarbylphosphorodithioate in dry cyclohexane in varying concentrations. The antimony compound was used in solution in a neutral hydrocarbon oil; said solution commercially available under the trade name Vanlube 622. This solution contained 10.9 weight percent antimony, 9.05 weight percent phosphorus, 19.4 weight percent sulfur and less than 100 ppm halogens. This corresponds to an antimony compound of the general formula cited above wherein the hydrocarbyl groups are substantially propyl radicals. After drying the impregnated catalyst under a heat lamp and then heating the catalyst to 900° F in a bed fluidized with nitrogen, the impregnated samples contained the quantities of antimony compound shown in the following table. The catalyst samples were all preaged by processing them through ten cracking-regeneration cycles in a laboratory-size confined fluid bed reactor system in which the catalyst was fluidized with nitrogen the feed being a topped crude oil feed from Borger, Texas. One cycle normally consisted of nominal 30 second oil feed time during cracking after which the hydrocarbons were stripped from the system with nitrogen for about 3 to 5 minutes. The reactor was then removed from the sand bath heater and purged with nitrogen as it cooled to room temperature in about 10 minutes. The reactor and its contents were then weighed to determine the weight of any coke deposited on the catalyst during the run. The reactor was then replaced in the sand bath, and while it was heated to regeneration temperature, air was passed through it. The overall regeneration time was about 60 minutes. The reactor was then cooled to reaction temperature and purged with nitrogen. Then, another cracking-regeneration cycle was started.

Each of these preaged catalyst portions was then evaluated in the fluid bed reactor using the topped crude oil from Borger, Texas, as a feedstock at a reactor temperature of about 950° F for 30 seconds. The catalyst was regenerated at 1,200° F. in the manner described before in connection with the preaging. The crude oil used had an API gravity rating at 60° F. of 21.4, a pour point of 63° F, and a viscosity of 32.1 SUS at 210° F.

The clay catalyst impregnated with the antimony compound had a pore volume of 0.29 cc/gram and a surface area of 74.3 square meters/gram. The catalyst contained metal oxides in a quantity calculated as metal of 0.38 weight percent nickel, 0.90 weight percent iron and 0.60 weight percent vanadium.

The catalyst to oil weight ratio in these five runs was adjusted to result in a conversion of 70 volume percent.

The results of the cracking operation with the catalyst portions containing the different quantities of antimony compounds are shown in the following Table I:

TABLE I

| Sb Added,[1] Wt. % | Catalyst Oil | YIELDS | | |
|---|---|---|---|---|
| | | Coke, Wt. % of Feed | SCF H$_2$ Bbl Conv. | Gasoline, Vol. % of Feed |
| 0 | 5.2 | 13.0 | 700 | 56.0 |
| 0.1 | 5.7 | 12.2 | 480 | 56.0 |
| 0.25 | 6.2 | 11.6 | 355 | 56.7 |
| 0.5 | 6.5 | 11.4 | 310 | 58.7 |
| 1.0 | 6.7 | 10.8 | 300 | 60.3 |

[1]The weight percentage is based on the weight of the cracking catalyst.

The results shown in the table indicate that the production of hydrogen and coke is decreased and the yield of gasoline is increased as the concentration of the antimony compound is increased.

With the second series of five portions of catalyst, the impregnation, pretreatment, aging and processing as described above was exactly repeated. For this series, however, the catalyst to oil ratio was adjusted in the actual test runs so that the conversion rate was 75 volume percent for all the catalyst portions. The results of this series of runs is shown in the following Table II:

TABLE II

| Sb Added,[1] Wt. % | Catalyst Oil | 75% Conversion YIELDS | | |
|---|---|---|---|---|
| | | Coke Wt. % of Feed | SCF H$_2$ Bbl Conv. | Gasoline, Vol. % of Feed |
| 0 | 7.4 | 16.4 | 800 | 54.8 |
| 0.1 | 7.3 | 13.9 | 500 | 57.0 |
| 0.25 | 7.2 | 13.2 | 400 | 59.3 |
| 0.5 | 7.2 | 12.7 | 340 | 61.6 |
| 1.0 | 7.5 | 11.6 | 315 | 63.0 |

[1]The weight percentage is based on the weight of the cracking catalyst.

The results shown in this table again indicate the reduction in hydrogen and coke production with increased antimony compound concentration and the increase in the gasoline production. A comparison with the results shown in Table I indicates that the catalyst activity is somewhat lower at 75 volume percent than at 70 volume percent of conversion. However, the same beneficial results as far as the yields are concerned are achieved.

EXAMPLE II

To compare the antimony 0,0-dialkylphosphorodithioate compound used in accordance with this invention with known additives, 18 portions of used catalyst were treated, impregnated and prepared as described in Example I. Six of these portions were impregnated with varying quantities of the antimony 0,0-dialkylphosphorodithioate compound used in Example I. Six portions of the catalyst were impregnated with triphenyl antimony. The last six portions of the catalyst finally were impregnated with tributylphosphine. Alll the additives were used as solutions in dry cyclohexane. The quantities of the additives were adjusted such that the weight percentage of antimony for the first two series and the weight percentage of phosphorous for the third series of portions was as indicated in the following Table III. With these catalyst samples, Kansas City gas oil was cracked having an API gravity of 30.2 at 60° F., a pour point of 100° F. and a viscosity of 39 SUS at 210° F. The cracking was carried out in a laboratory size fixed bed reactor system at 900° F. The oil to catalyst ratio was adjusted to a 75 volume percent conversion rate.

The selectivity to gasoline, the coke content and the hydrogen production were measured. All results were compared relative to the results obtained with a catalyst containing no treating agent which were arbitrarily given a rating of 1.00. The selectivity to gasoline is defined as the volume of liquid products boiling below 400° F. divided by the volume of oil converted times 100. The oil converted is the volume of feed minus the volume of recovered liquid boiling above 400° F. Thus, for instance, if the selectivity to gasoline of the untreated catalyst was 50 volume percent, the selectivity of a treated catalyst of 1.04 in the following table would refer to a selectivity of 52 volume percent of this treated catalyst.

The coke content of the catalyst is measured by weighing the dry catalyst after the cracking process. The hydrogen quantity produced is determined in standard equipment analyzing the hydrogen content of the gaseous products leaving the reactor.

The results of these various runs are shown in the following Table III:

TABLE III

| Treating Agent[1] | Selectivity to Gasoline | | | Coke, Wt. % of Feed | | | SCF H$_2$/Barrel Converted | | |
|---|---|---|---|---|---|---|---|---|---|
| | A | B | C | A | B | C | A | B | C |
| 0.1 | 1.04 | 1.00 | 1.02 | 0.95 | 0.92 | 1.00 | 0.69 | 0.85 | 0.91 |
| 0.2 | 1.06 | 1.00 | 1.04 | 0.92 | 0.87 | 0.98 | 0.62 | 0.75 | 0.86 |
| 0.3 | 1.07 | 1.00 | 1.05 | 0.88 | 0.83 | 0.97 | 0.60 | 0.68 | 0.82 |
| 0.4 | 1.08 | 1.00 | 1.04 | 0.87 | 0.81 | 0.97 | 0.58 | 0.63 | 0.79 |
| 0.5 | 1.09 | 1.00 | 1.04 | 0.85 | 0.80 | 0.96 | 0.56 | 0.60 | 0.78 |
| 1.0 | 1.12 | 1.02 | 1.01 | 0.85 | 0.80 | 0.92 | 0.56 | 0.56 | 0.74 |

[1]The figures refer to weight percent of antimony for run A where the treating agent is antimony 0,0-dialkylphosphorodithioate having an antimony content of 10.9 wt. %, and run B where the treating agent is triphenylantimony, and to weight percent phosphorus for run C where the treating agent is tributyl phosphine.

From the results of this table, it can be seen that the treating agent of the present invention provides the best overall results of the tested additives. The high selectivity for the formation of gasoline and the lowest amount of hydrogen produced is achieved by the additive of this invention whereas the coke formation is intermediate between the coke formations of the other two additives.

EXAMPLE III

The following example was carried out in order to determine whether a mixture of the known treating agents triphenyl antimony and tri-n-butyl phosphine would give results superior to each one of the individual treating agents alone. Therefore, triphenyl antimony and tri-n-butyl phosphine were dissolved in dry cyclohexane and the mixture was used to impregnate dry used cracking catalysts of the type and in the manner described in Example I. The catalyst samples preaged as described using ten cracking-regeneration cycles with the topped crude oil feed from Borger, Texas. Each treated catalyst was then used to crack Kansas City gas oil at 900° F. and an oil feed time of about 30 seconds as described. The ratio of catalyst to oil was varied to vary the conversion. Three catalyst samples were prepared, the first of which contained 0.25 weight percent phosphorus and 0.75 weight percent antimony, the second contained 0.5 weight percent of phosphorus and 0.5 weight percent of antimony and the third contained 0.75 weight percent of phosphorus and 0.25 weight percent of antimony.

At 75 volume percent conversion rate, the hydrogen produced with the coimpregnated catalysts was 25 to 40 percent less than the hydrogen produced with the untreated catalyst. The quantity of hydrogen produced was essentially equal to the amount of hydrogen produced with a catalyst treated with an equal amount of antimony derived from the triphenylantimony alone, i.e., without any tri-n-butyl phosphine. Also, the quantity of coke produced and the selectivity to gasoline were the same in those runs containing the same quantity of antimony regardless of whether or not any tri-n-butyl phosphine was present.

These results indicate that the treating of the catalyst with the mixture of antimony compound and the phosphorus compound did not improve the operation over a process using a catalyst treated with triphenylantimony alone. Examples I and II, on the other hand, show that the treatment of catalyst with the antimony compounds of the instant invention provides considerably better cracking results than were obtained with a catalyst treated only with the triphenyl antimony compound.

EXAMPLE IV

A cracking catalyst that is commercially available under the trademark Filtrol 900 was employed in this example. This catalyst was a clay-based catalyst. The used catalyst contained about 0.6 weight percent cerium, 0.4 weight percent lanthanum and 0.33 weight percent nickel, 0.56 weight percent vanadium and 0.89 weight percent iron. The catalyst was used in a pilot plant size transfer line cracking reactor to crack Kansas City gas oil. To this gas oil feed the same antimony compound as employed in Example I was added in a quantity of about 10.8 weight percent based on the gas oil feed for a time sufficiently long to deposit 0.37 or respectively 0.67 weight percent of antimony on the catalyst. Thus two samples of treated catalyst were obtained, one containing 0.37 weight percent of antimony and the second containing 0.67 weight percent of antimony. The thus-treated catalysts were recovered from the reactor and evaluated in a laboratory size fixed bed reactor at 900° F. for cracking Kansas City gas oil for about 30 seconds and in a fluid bed reactor for cracking Borger topped crude oil at 950° F. for about 30 seconds. The aging and the test runs were carried out in the same way as described in connection with Example I. The surface area of the untreated catalyst was 67.4 square meters/gram and the pore volume of the catalyst was 0.31 cc/gram. The treated catalyst containing 0.67 weight percent of antimony had a surface area of 57.5 square meters/gram and a pore volume of 0.26 cc/gram. The results obtained with the catalyst samples are contained in the following tables.

TABLE IV

| Catalyst Wt. % Antimony[1] | Catalyst /Oil Ratio | Conversion Vol. % | Yields Gasoline, Vol. % | Coke, Wt. % | SCF H$_2$/BBl. Conv. |
|---|---|---|---|---|---|
| 0 (control) | 6.3 | 73.4 | 52.4 | 8.0 | 477 |
| 0.37 | 7.5 | 73.4 | 57.5 | 6.9 | 269 |
| 0.67 | 9.4 | 73.4 | 51.4 | 7.3 | 330 |

[1]The weight percentage is based on the weight of the cracking catalyst.

TABLE V

| Catalyst Wt. % Antimony | Catalyst /Oil Ratio | Conversion Vol. % | Gasoline, Vol. % | Coke, Wt. % | SCF H$_2$/BBl. Conv. |
|---|---|---|---|---|---|
| 0 (control) | 8.2 | 72.5 | 68.0 | 13.8 | 685 |
| 0.67 | 8.2 | 69.9 | 63.3 | 11.0 | 541 |

From the results shown, it can be seen that at the same conversion rate the coke production and the hydrogen production were reduced as compared to the untreated catalyst by the additive of this invention. The gasoline conversion was comparable in the case of the higher concentration of antimony treating agent. In the case where the catalyst/oil ratio was kept constant, the coke production and the hydrogen production were reduced by the antimony compound. The lower activity of the catalyst with 0.67 weight percent antimony is supposed to reside in the fact that this catalyst had a lower surface area and a smaller pore volume than the control catalyst.

EXAMPLE V

This calculated example is given to show the operation of the invention in plant scale. In a cracking unit containing 200 tons of active clay catalyst 24,300 bbl/day of oil having an API gravity of 20.8 are cracked. In order to build up a level of 0.5 weight percent (based on catalyst) of antimony on the catalyst the antimony compound has to be added in a quantity of 20 ppm of antimony to the feedstock for 17 days or of 30 ppm of antimony to the feedstock for 10 days. In order to keep the antimony level at 0.5 weight percent, the rate of addition has to be 10 ppm of antimony in case 8 tons of catalyst per day are withdrawn from the reactor and replaced by untreated catalyst. In case only 6 tons of catalyst per day are replaced, this addition would be sufficient to keep the antimony level of the system at 0.65 weight percent. In absolute figures this means that 2175 pounds of Vanlube 622 per day have to be added to the feedback for 10 days (1,450 pounds respectively for 17 days) and that 725 pounds of Vanlube per day have to be added to the feedstock to maintain the desired level of antimony compound on the catalyst at 0.5 weight percent.

Reasonable variations and modifications which will be apparent to those skilled in the art can be made in this invention without departing from the spirit and scope thereof.

I claim:

1. A process for catalytic cracking of hydrocarbons wherein
   a. a hydrocarbon feed is introduced into a cracking zone,
   b. said feed is contacted in said cracking zone with the cracking catalyst under cracking conditions whereby the feed is cracked,
   c. the cracked feed is removed from said cracking zone for further processing, and
   d. metals deposited on said cracking catalyst and tending to deactivate said cracking catalyst are passivated
      by contacting said cracking catalyst with an antimony compound having the general formula

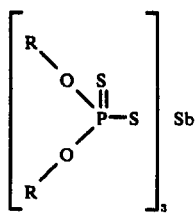

wherein the radicals R which can be the same or different are hydrocarbyl radicals having from 1 to about 18 carbon atoms per molecule.

2. A process in accordance with claim 1 wherein said antimony compound is added to said hydrocarbon feed.

3. A process in accordance with claim 2 wherein said antimony compound is metered to the hydrocarbon feedstock until a predetermined level of said compound on the catalyst is reached and wherein thereafter the antimony compound is metered to the feedback in a quantity sufficient to maintain said level.

4. A process in accordance with claim 3 wherein the antimony compound initially is fed to the hydrocarbon feedstock in a quantity in the range of about 0.1 to 15,000 ppm based on the hydrocarbon feedstock.

5. A process in accordance with claim 1 wherein the entire number of carbon atoms per molecule of antimony compound is between 6 and about 90.

6. A proess in accordance with claim 1 wherein the radicals R are selected from the group consisting of alkyl or cycloalkyl radicals having 2 to about 10 carbon atoms per radical, substituted or unsubstituted cyclopentyl and cyclohexyl radicals, and substituted and unsubstituted phenyl radicals.

7. A process in accordance with claim 1 wherein said antimony compound comprises about 6 to about 21 weight percent antimony.

8. A process in accordance with claim 1 wherein said antimony compound is used in a quantity of up to about 1.5 weight percent of the catalyst to be treated.

9. A process in accordance with claim 2 wherein said antimony compound is added to the hydrocarbon feed upstream of a pump feeding said feed into the cracking zone.

10. In a process for catalytic cracking of hydrocarbons, wherein a hydrocarbon feed is introduced into a cracking zone, said feed is contacted in said cracking zone with a cracking catalyst under cracking conditions whereby the feed is cracked, wherein the cracked feed is removed from the cracking zone for further processing, wherein the cracking catalyst is circulated from the cracking zone to a regeneration zone and back, the improvement comprising passivating contaminating metals deposited on said catalyst by contacting said catalyst with an antimony compound having the general formula

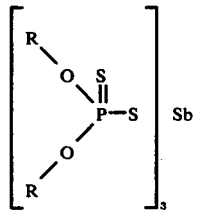

wherein the R groups which can be the same or different are hydrocarbyl radicals each containing from 1 to about 18 carbon atoms.

11. The process of claim 10 wherein the antimony compound is added to the hydrocarbon feed to the cracking zone.

* * * * *

UNITED STATES PATENT AND TRADEMARK OFFICE
CERTIFICATE OF CORRECTION

PATENT NO. : 4,031,002
DATED : June 21, 1977
INVENTOR(S) : Dwight L. McKay

It is certified that error appears in the above-identified patent and that said Letters Patent are hereby corrected as shown below:

Column 9, line 23 (claim 3), "feedback" should read ---feedstock ---; line 34 (claim 6), "proess" should read --- process ---.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*